United States Patent [19]
Post

[11] Patent Number: 5,822,527
[45] Date of Patent: *Oct. 13, 1998

[54] METHOD AND APPARATUS FOR INFORMATION STREAM FILTRATION USING TAGGED INFORMATION ACCESS AND ACTION REGISTRATION

[75] Inventor: Mark J. Post, Hollis, N.H.

[73] Assignee: Digital Equipment Corporation, Maynard, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 855,333

[22] Filed: May 13, 1997

Related U.S. Application Data

[63] Continuation of Ser. No. 519,125, May 4, 1990, abandoned.

[51] Int. Cl.$^6$ ................................................ G06F 15/163
[52] U.S. Cl. ................................ 395/200.36; 364/284.3; 395/683
[58] Field of Search ........................ 395/200.36, 200.37, 395/683

[56] References Cited

U.S. PATENT DOCUMENTS

| | | | |
|---|---|---|---|
| 4,049,906 | 9/1977 | Hafner et al. | 178/2 C |
| 4,532,588 | 7/1985 | Foster | 395/650 |
| 4,713,758 | 12/1987 | De Kelaita et al. | 371/15.1 |
| 4,737,783 | 4/1988 | Tanaka et al. | 340/825.5 |
| 4,740,787 | 4/1988 | Kimura | 340/825.08 |
| 4,845,658 | 7/1989 | Gifford | 364/900 |
| 4,870,571 | 9/1989 | Frink | 364/200 |
| 4,879,561 | 11/1989 | Inkol | 342/195 |
| 4,926,375 | 5/1990 | Mercer et al. | 364/900 |
| 4,962,532 | 10/1990 | Kasirat et al. | 380/25 |
| 4,994,985 | 2/1991 | Cree et al. | 364/514 |
| 5,136,580 | 8/1992 | Videlock et al. | 370/60 |
| 5,283,856 | 2/1994 | Gross et al. | 395/51 |
| 5,434,978 | 7/1995 | Dockter et al. | 395/200 |
| 5,576,952 | 11/1996 | Stutman et al. | 364/413.02 |
| 5,619,648 | 4/1997 | Canale et al. | 395/200.01 |
| 5,644,571 | 7/1997 | Seaman | 370/401 |
| 5,734,903 | 3/1998 | Saulpaugh et al. | 395/683 |

OTHER PUBLICATIONS

Malone et al., "Semistructured Messages are Surprisingly Useful for Computer–Supported Coordination," Reading 12, Massachusetts Institute of Technology, pp. 311–331.

MacKay, "More Than Just a Communication System: Diversity in the Use of Electronic Mail," Extended Abstract Submitted for the ACM Conference on Computer–Supported Cooperative Work, Portland, Oregon, Sep. 26–28, 1988, pp. 1–13 and Table 1.

Marca et al., The Foundation for GROUPWARE, A Tutorial for Building Collaborative Systems, Oct. 19, 1989, Revised Nov. 27, 1989.

*Primary Examiner*—Lance Leonard Barry, Esq.
*Attorney, Agent, or Firm*—David A. Dagg

[57] ABSTRACT

An object-oriented filter for an information stream includes an interface module to provide a common interface for accessing an application program and a filter module. The filter module uses suitable predefined functions to test the "tagged" fields of a current message from the information stream against filter rules and to determine the "actions" to be performed.

8 Claims, 4 Drawing Sheets

METHOD AND APPARATUS FOR INFORMATION STREAM FILTRATION USING TAGGED INFORMATION ACCESS AND ACTION REGISTRATION

This application is a continuation of application Ser. No. 07/519,125, filed May 4, 1990, now abandoned.

BACKGROUND OF THE INVENTION

This application relates to information and data manipulation and, more particularly, to an object-oriented software filter for a stream of input data read by a data processing system.

Persons using data processing systems must often review and assimilate large amounts of data. For example, a person using an electronic mail system may receive hundreds of mail messages per day. It is desirable to screen large amounts of incoming data automatically and, for example, to extract the most important data or ignore routine data.

Software programs often receive and transmit data in the form of "information streams." Information streams are sequentially organized groups of data, such as sequentially received mail messages input to an electronic mail system or telemetry data output from instruments on an aircraft. Common characteristic of information streams are their sequential nature, and their lack of defined relationships between the groups of information that make up the streams. In contrast, information stored in memory 108, for example, can be randomly accessed and may have relationships defined between the information.

Software programs called "filters" have been designed to allow data processing system users limited screening capabilities by organizing information streams according to priorities set by the users. Filters differ from information retrieval systems and data bases, in that filters receive "dynamic" information streams that have not been placed in permanent memory. For example, in some electronic mail systems, filters allow users to place all mail messages dealing with a selected topic in permanent storage or to delete all mail messages dealing with other selected topics. Conventional software filters have been cumbersome, however because they are customized for specific information streams.

The dependence of filters on specific information streams is only one shortcoming of conventional filters. Another problem is that methods of interfacing filters to application programs are not standardized. Filtration capabilities are often built into the application programs themselves, and thus, are integrally tied to the format of the information stream received by a specific application program. Thus, for the most part, filters cannot be used with application programs other than those for which they were designed.

Because of this extreme dependence on the format of the information stream, conventional filters must be completely rewritten for each information stream they are to filter. Thus, creating conventional filters is an expensive and time-consuming process. A computer programmer creating a new filter for an information stream and an application program must not only possess technical knowledge of the interface functions required for the application program, but must also know the details of the information streams. Furthermore, the computer programmer must rewrite the filter each time he wishes to filter a differently formatted information stream or to interface to a new application program.

In addition, conventional filters have been designed for information stream containing ASCII-type fields. This limits the general use of such filters.

What is needed is a filter that can operate with various information streams with little or no modification.

A filter is also needed that can interface with various application programs with little or no modification.

In addition, it would be desirable for such filters to be able to test an information stream which had contained data other than ASCII data.

SUMMARY OF THE INVENTION

The present invention overcomes the problems and disadvantages of the prior art by providing an object-oriented filter that can filter information streams from any application program. The invention includes an interface module for each application program receiving an information stream to be filtered. Each interface module provides a standard interface to a filter module. The filter module uses the standard interface to perform the object oriented techniques of tagged information access and action registration, so that the filter module can access any information stream and perform actions appropriate to that stream.

In accordance with the purpose of the invention, as embodied and broadly described herein, the method of filtering an information stream includes the steps of: registering tags corresponding to the fields of the messages in the information stream, the tags identifying respective names of the fields; registering actions capable of being performed with respect to messages in the information stream; reading a selected field of a current one of the messages in the information stream, the selected field identified by a registered tag contained in a one of the predetermined filter rules; testing the selected field of the current message according to the one filter rule to see whether the one filter rule should apply; and performing a one of the registered actions according to the one filter rule when the one filter rule has been determined to apply.

Also in accordance with the purpose of the invention, as embodied and broadly described herein, the method of this invention relates to a method of filtering an information stream using an object-oriented filter. The method includes the steps, performed by the data processing system, of: receiving, from the data processing system, tag information that identifies the fields of the information stream; requesting, in accordance with the tag information, a message field of a current one of said messages in the information stream; receiving the requested message field of the current message; and accepting the current message when the received message field satisfies one of the predetermined filter rules.

In further accordance with the purpose of the invention, as embodied and broadly described herein, the apparatus of this invention relates to an object oriented filter. The apparatus comprises: a memory for storing the predetermined filter rules; means for receiving the information stream; means for registering tags corresponding to the fields of the messages in the information stream, the tags identifying respective names of the fields; means for registering actions capable of being performed with respect to messages in the information stream; means for reading a selected field of a current one of the messages in the information stream, the selected field identified by a registered tag contained in a one of the predetermined filter rules; means for testing the selected field of the current message according to the one filter rule to see whether the one filter rule should apply; and means for performing a one of the registered actions according to the one filter rule when the one filter rule has been determined to apply.

Advantages of the invention will be set forth in part in the description which follows and in part will be obvious from the description or may be learned by practice of the invention. The advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

The present invention is preferably embodied in software programs residing on a VAX data processing system operating under the VMS or Ultrix operating system, all of which are manufactured by Digital Equipment Corporation. In a preferred embodiment, the software programs are written in the C++ programming language. The present invention, however, is not limited to these specific processing system, operations system, or programming languages. In addition, the preferred implementation of this invention is described in terms of filtering an information stream input to an electronic mail system, although the present invention is not limited to an electronic mail system, and may involve filtering other types of information streams input to other application programs.

Figure 1:
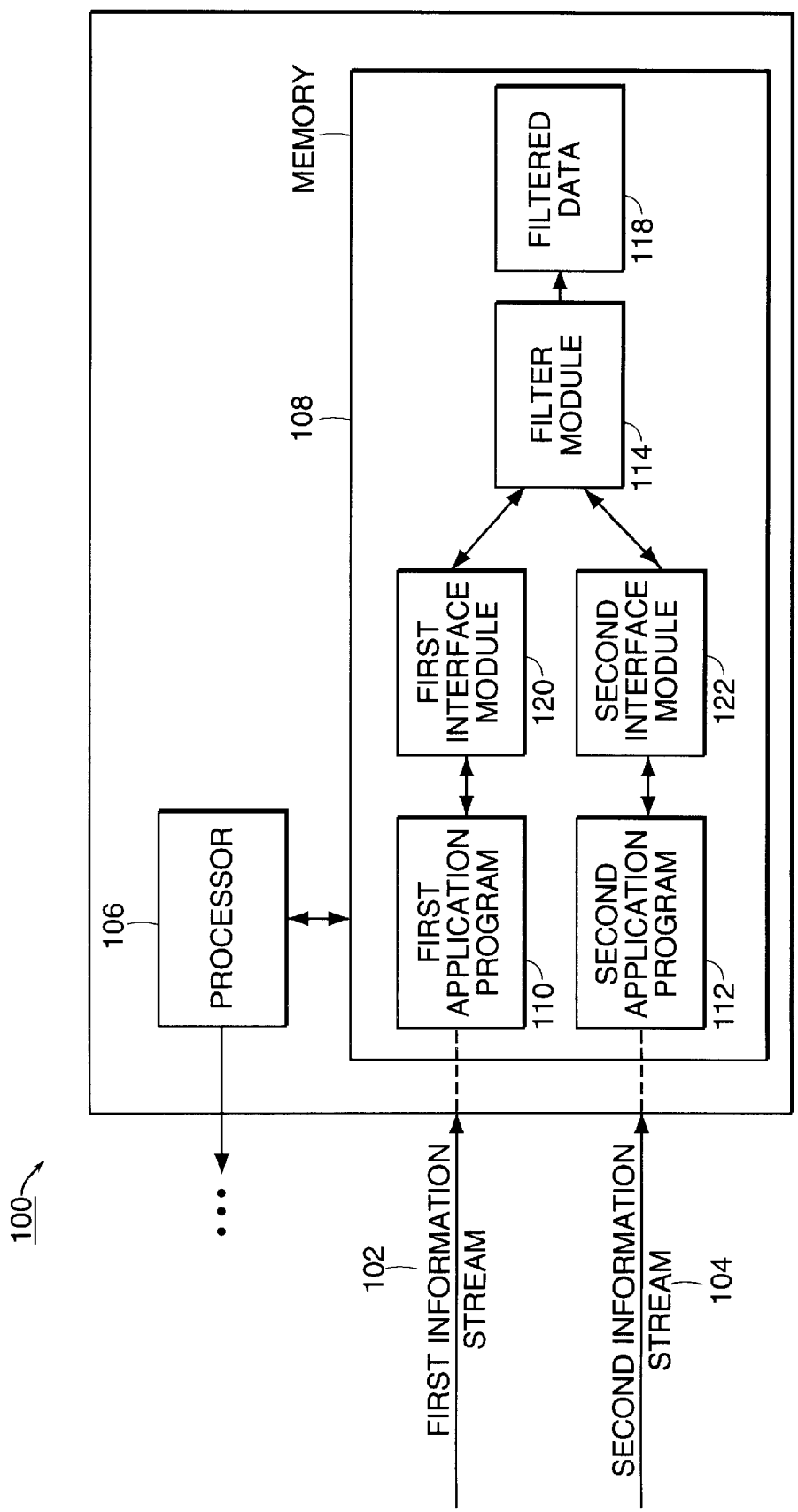
FIG. 1 is a block diagram of a preferred implementation of the present invention in a data processing system.

FIG. 1 is a block diagram of a data processing system 100 incorporating the present invention. In FIG. 1, data processing system 100 includes a processor 106 and a memory 108 and receives input from two information streams 102 and 104. Each of the information streams 102 and 104 is composed of units of information called "messages." Information stream 102 is of a first type and the messages of information stream 102 have a first format. Information stream 104 is of a second type and the messages of information stream 104 have a second format. Each message of information streams 102 and 104 consists of fields and each field has a name or "tag" by which the field is identified. For example, a field identifying a sender of a mail message may have a tag of "FROM".

Each type of information stream has a set of "actions" that can be performed on messages in information streams of that type. For example, a message in an information stream of mail messages can have a "write" action performed upon them to write the message to storage in memory 108. As a second example, messages in an information stream consisting of bit mapped data may have an "Exclusive OR" action that can be performed upon them. The actions that can be performed on messages in an information stream depends on the type of messages in the information stream, and it is not possible to provide an exhaustive list herein.

Memory 108 stores a first application program 110 which receives input from a first information stream 102 and second application program 112 which receives input from a second information stream 104.

Memory 108 also stores a first interface module 120, which interfaces with the first application program 110, a second interface module 122, which interfaces with the second application program 112, and a filter module 114. Both interface modules 120 and 122 provide a common, standard interface to filter module 114 in addition to the customized interface to the corresponding application program. The standard interface to filter module 114 uses object-oriented commands, as described below. Filter module 114 outputs those messages in information streams 102 or 104 that satisfy predetermined rules to a filtered data section 118. Other messages in information streams 102 or 104 that do not satisfy the rules may be discarded or written to some other area of memory 108 (not shown).

The operation of filter module 114 does not require knowledge of the specific formats of the underlying information streams 102 and 104 because of the standard interface. Filter module 114 accesses information streams 102 and 104 through standard functions, which are part of the standard interface between the filter module and the interface module. Examples of standard functions are "get a number of fields in a message," "get a first field of the message," and "perform an action on a message." This technique of accessing an information stream only through standard functions is an example of a programming model known as object oriented programming.

As is apparent from the description of the capabilities of the various modules of data processing system 100, the filtering capabilities of this invention are far superior to those available conventionally. Filter module 114 can filter the information streams of either of application program 110 or 112, regardless of the format of the information streams or the interface functions recognized by the application programs.

As explained above, filter module 114 accesses the information streams by way of standard functions. This is implemented in part by setting the communication between the application programs 110 and 112 and program corresponding interface modules 120 and 122 in terms of "interface functions" that allow interface modules 120 and 122 to communicate with their respective application programs. The implementation details of the interface functions in interface modules 120 and 122 depend on the application programs, but the functions used by filter module 114 to interface to the interface modules are always the same.

The filter module must, however, know which fields are in a message of the information stream and must also know which actions can be performed on messages of the information stream, i.e., which "interface functions" are included in the interface module to access the application program. This information is transmitted to the filter module by "tag registration" and "action registration" processes described below. In "tag registration," the interface modules advises the filter module of the number and names of the fields in the information stream on which filtering may take place. In "action registration," the interface module advises the filter module of which actions can be performed on messages in the information stream. This tag and action registration allows object oriented programming to work because it provides the details needed for performing filtering functions defined at an object level.

The action and tag registration information is thus sent from the interface modules 120 and 122 to the filter module 114, as are the contents of tagged fields which are to be used for filtering tests and the names of actions that can be performed on messages in the information stream. Requests from filter module 114 for tag and action registration information, field contents, and performance of actions are sent to interface modules 120 and 122 using standard interface functions as described above.

Figure 2:
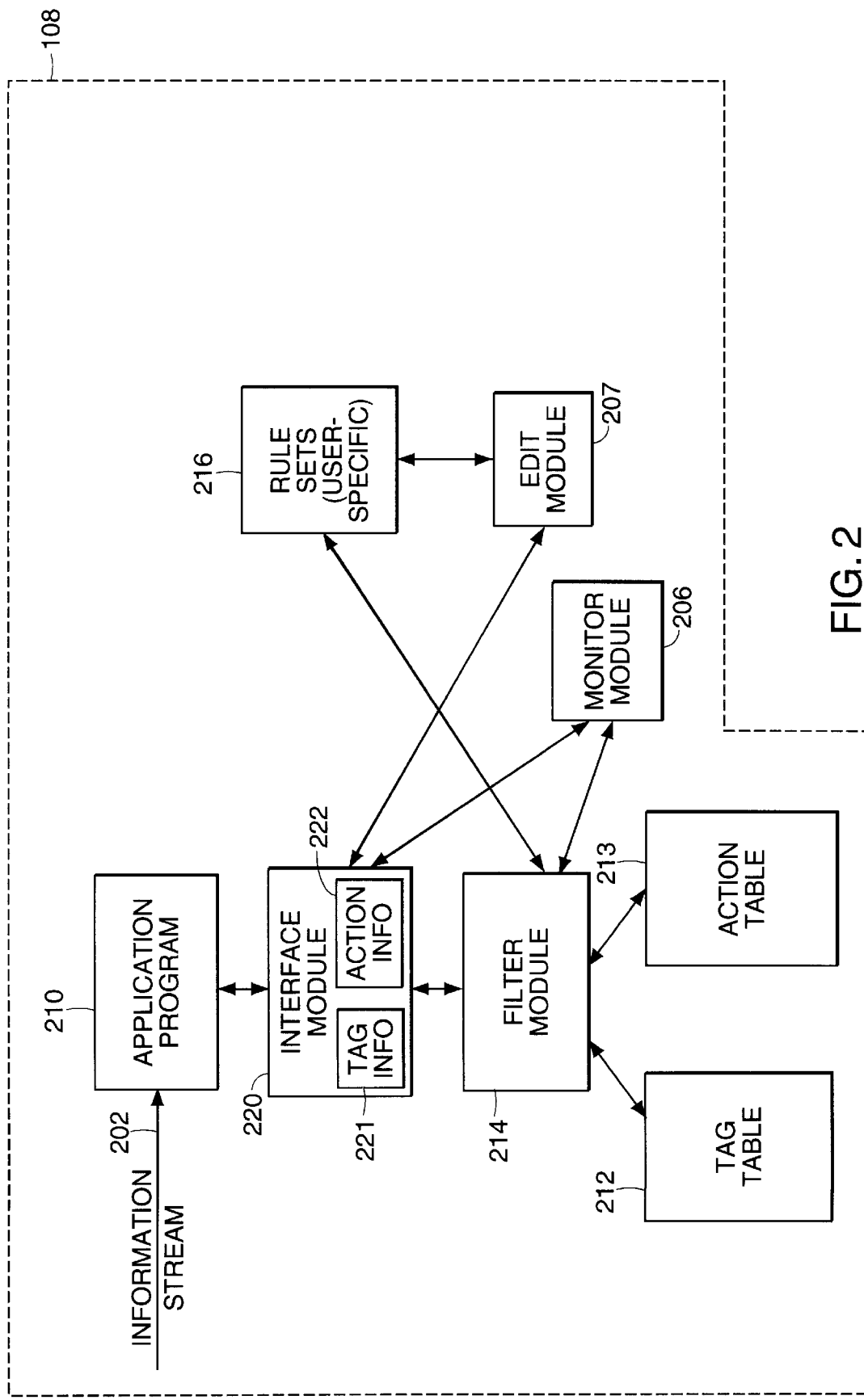
FIG. 2 is a block diagram showing the interrelationships between certain elements in the preferred implementation of FIG. 1 and additional software modules and data structures used in a preferred implementation of the present invention.

FIG. 2 is a block diagram showing the interrelationship between an application program 210, an interface module 220, and a filter module 214 and shows additional data structures and software modules used in a preferred implementation of the present invention. The data structures include rule sets 216, tag table 212, and action table 213, and the software modules include monitor module 206 and edit module 207. Each of these elements is preferably stored in a memory 108 and is described below.

Application programs 110 and 112, interface modules 120 and 122, and filter module 114 of FIG. 1 preferably have similar data structures and modules, but for purposes of simplicity, only the operational data structures and modules for application program 210, interface module 220, and filter module 214 will be described. The operations described could also occur with application programs 110 and 112, interface modules 120 and 122, and filter module 114 of FIG. 1.

Rule sets data structure 216 includes a variety of predetermined filter criteria in the formal user-defined rules which describe how a user wishes to filter his incoming information streams. The rules in rule set 216 preferably have a general form:

IF <condition> THEN <action>.

An example of a rule applied to information stream 202 comprising several messages is:

IF source_field="SMITH" THEN write message to "Smithfile."(1)

In this rule, if a current message in information stream 202 has a value of "SMITH" in a field identifying a source of the message, then the current message is written to a file named "Smithfile."

Another example of a rule having the format shown above for information stream 204, also comprising several messages, is:

IF message body contains "Company" and "quarterly report" THEN mail to person1. (2)

In this rule, if a message in information stream 202 contains the words "Company" and "quarterly report," then that message is sent to person1 via inter-office mail.

Rule sets data structure 216 may use any of a number of well-known formats for storing such IF-THEN rules, or may store the rules in different forms.

The user may also specify, at the time of rule creation or editing, a "type" for each data field accessed by the rule. Thus, for Rule (1) above, the user may specify that "source_ field" consists of ASCII characters. The user may also specify data field types other than ASCII. Thus, for example, to implement the rule:

IF "picture_field" has blue elements THEN write image to "save-picture." (3)

the user would specify that "picture_field" has a type of "IMAGE" and contains a graphics image bit map.

Tag table 212 preferably is an array containing "tags," which are names for the fields in messages received by filter module 214 in information stream 202. Tag table 212 is established dynamically through a process called "tag registration" which, as described in greater detail below, is performed at run-time by filter module 214 using information from interface module 220.

Action table 213 preferably is an array listing the "actions" that can be performed on the various types of messages registered in tag table 212 by filter module 214. Action table 213 is also established dynamically through a process called "action registration," which, as described in greater detail below, is performed at run-time by filter module 214 using information from interface module 220. Alternately, any suitable method or data structure could be used for keeping the data in action table 213.

Monitor module 206 alerts filter module 214 when new information appears in information stream 202. Preferably, monitor module 206 is not activated until filter module 220 informs monitor module 206 to detect a current message. At this time monitor module 206 checks whether a new message has appeared in information stream 202 and reports the presence or absence of a new message to filter module 220. Monitor module 206 is not essential to the operation of the preferred implementation. Alternatively, monitor module 206's function can be incorporated into some other module.

Edit module 207 allows the user to create rule sets or to alter one or more of the rules in rule set 216. In a preferred embodiment, edit module 207 is a Graphical User Interface (GUI) that allows a user to alter rules displayed on a terminal through use of a keyboard and mouse. Other preferred embodiments may use a line editor, menu forms interface, or some similar method that allows a user to create and alter the rules of rule set 216. Edit module 207 also allows a user to specify the input stream which is to be filtered and to specify types and actions contained in the rules. In the described embodiment, edit module 207 accesses tag data 221 and action data 222 stored in memory 108 in connection with interface module 220 and uses the information to constrain the user from specifying actions inappropriate for a specified information stream during rule creation. For example, it may be inappropriate to perform a "delete" action on certain types of information streams, such as entries in a data base. Thus, if information stream 202 contains data base entries, edit module 207 will access action information 222 and determine that "delete" is not a proper action for messages of information stream 202 and, thus, edit module 207 will not allow a user to create a rule for information stream 202 having a "delete" action in the <action> portion of the rule. In addition, as described below, the "delete" action will not be one of the actions registered in action table 213.

Figure 3:
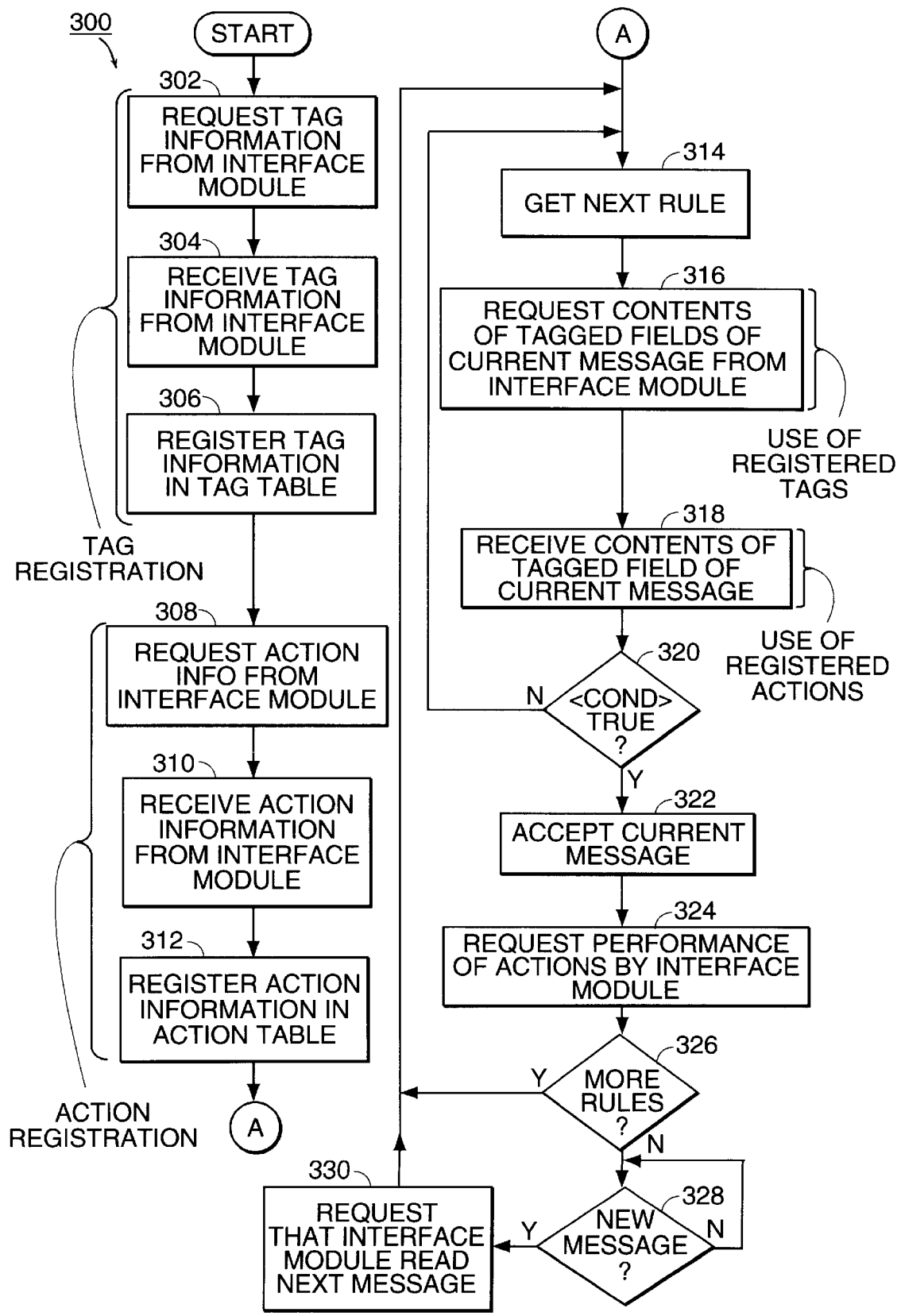
FIG. 3 is a flow chart of steps performed by the filter module of FIGS. 1 and 2 in a preferred implementation of the present invention.

FIG. 3 is a flow chart 300 of steps performed by the filter module 214 of FIG. 2 (and also by filter module 114 of FIG. 1) during a preferred implementation of a filtration process. Flow chart 300 includes steps 302 through 330.

Prior to describing flow chart 300 further, it is important to understand that interface module 220 and filter module 214 are programs resident in memory 108 and are executed by processor 106. Although the modules 220 and 214 are preferably shown as separate programs, they can be in the same program. One advantage of using separate programs is that the filter modules can be changed with little difficulty. Another advantage of using separate programs is that the filter module and the interface modules can reside in different systems in a distributed computing environment.

In step 302, filter module 214 requests tag information from interface module 220, using at least one of the standard functions. This tag information includes data such as the number and name of all possible tags in messages of information stream 202.

In step 304, at run time, filter module 214 receives the requested tag information from interface module 220 and, in step 306, filter module 214 enters the received tag information in tag table 212. This process will be referred to as "registering" the tag information. Steps 302 through 306 make up the "tag registration process."

In step 308, at run time, filter module 214 requests action information from interface module 220 using at least one of the standard interface functions. This action information includes data such as the name of all possible actions that can be performed on messages of information stream 202 and the parameters needed to perform these actions.

In step 310, filter module 214 receives the requested action information from interface module 220 and, in step 312, filter module 214 registers the received action information in action table 213. Steps 308 through 312 make up the "action registration process."

After the tag registration and action registration processes, filter module 214 is ready to filter by applying predetermined filter rules to the messages in information stream 202. These filter rules have preferably been created and edited using edit module 207, as described above. In step 314, a next rule is fetched from rule set 216.

In step 316, filter module 214 looks at the <condition> portion of the fetched rule. This condition portion identifies, by their tag names, the fields of a current message in information stream 202 to be tested next. If one or more tagged fields need to be received prior to testing, the tagged fields in the <condition> portion are requested from interface module 220 in step 316 using standard interface functions and the tag information registered in tag table 212. In step 318, the contents of the requested tagged fields of a current message of information stream 202 are received from interface module 220. In a preferred embodiment, the tagged fields received in step 318 are cached in memory 108 so that if the same tagged fields are requested again for the current message it is not necessary to perform step 316 and 318 a second time.

In step 320, once the contents of the tagged fields are received, filter module 214 determines whether the <condition> portion of the rule is true or false. If the result of the determination of step 320 is that the condition is false, then control returns to step 314. If the determination of step 320 is that the condition is true then control passes to step 322.

In step 322, the current message is accepted. This means that filter module 214 recognizes that it must perform some action related to filtering the current message. In step 324, filter module 214 sends a request to interface module 220 to perform the actions in the <action> module of the current rule being tested. These actions will be one of the actions whose calling parameters are defined in action table 213. This request is made using the standard interface functions and using the information registered in action table 213. In step 326, filter module 214 determines whether more rules remain in rule set 216. If more rules remain in rule set 216, control passes to step 314. Otherwise, in step 328, filter module 214 determines whether a new message has been received in information stream 202. As discussed above, this information is preferably received from monitor module 206. If a new message is available, filter module requests that interface module 220 read a next current message in step 330 and control passes to step 314. Otherwise, filter module 214 waits for a new message to be available.

Figure 4:
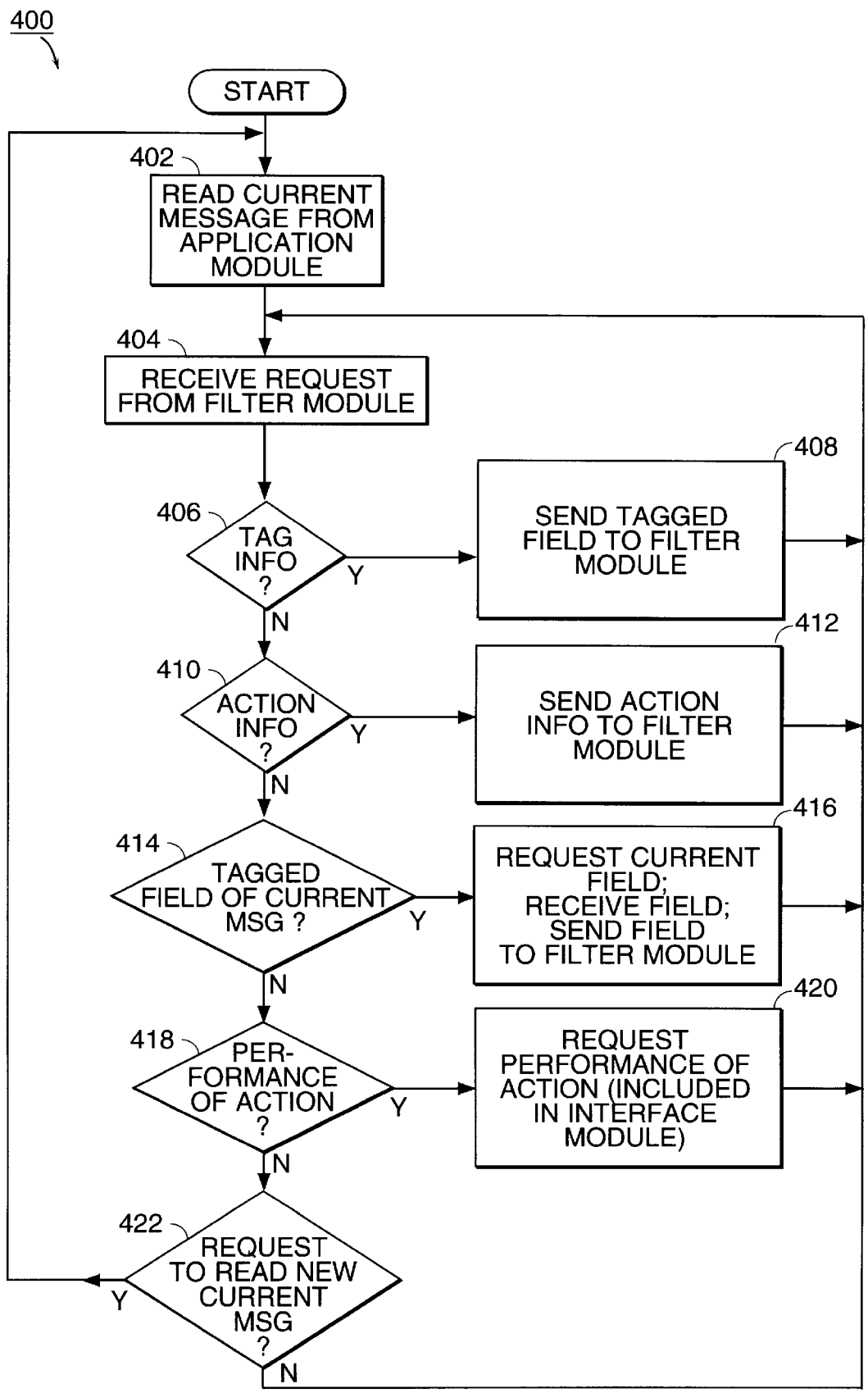
FIG. 4 is a flow chart of steps performed by the interface module of FIGS. 1 and 2 in a preferred implementation of the present invention.

FIG. 4 is a flow chart 400 of steps performed by interface module 220 of FIG. 2 (and interface modules 120 and 122 of FIG. 1) in conjunction with the steps in flow chart 300 of FIG. 3. In step 402, interface module 220 reads a current message from information stream 202 through application program 210. The mechanisms by which application program 210 extracts messages from information stream 202 and by which interface module 220 retrieves those messages from application program 210 are known by persons of ordinary skill who are knowledgeable about the details of program 210 and information stream 202. Thus, those mechanisms will not be described in further detail.

In step 404, interface module 220 receives a request from filter module 214 generated in steps 302, 308, 314, or 324 of FIG. 3 using the standard interface functions. If, in step 406, interface module 220 determines that the request from filter module 214 is for tag information (responsive to a request from step 302 in FIG. 3), interface module 220 accesses tag information 221 stored in memory 108 in connection with interface module 220 and specific to information stream 202 input to application program 210. The tag information is then sent to filter module 214 in step 408 and control passes to step 404.

If, in step 410, the request is for action information (responsive to a request from step 308 in FIG. 3), interface module 220 accesses action information 222 stored in memory 108 in connection with interface module 220 and specific to information stream 202 input to application program 210. The action information is then sent to filter module 214 in step 412 and control passes to step 404.

If, in step 414, the request is for the contents of a tagged field of the current message (responsive to a request from step 318 in FIG. 3), interface module 220 sends the contents of that tagged field from the current message read in step 402 to filter module 214 in step 416 and control passes to step 404.

If, in step 418, the request is for performance of an action on the current message of information stream 220 (responsive to a request from step 324 in FIG. 3), interface module 220 instructs application program 210 by way of appropriate interface commands to perform the action in step 420 and control passes to step 404.

If, in step 422, filter module has requested that a new message be read in step 330 of FIG. 3, then control passes to step 402. Otherwise, control passes to step 404.

Appendices A through D, which are incorporated in and are a part of the specification, show details of one embodiment of the present invention.

Appendix A shows an example of tagged fields of a message in information stream 202 when application program 210 is VMS Mail, an electronic mail program manufactured by Digital Equipment Corporation. As stated before, application program 210 may be any type of program that receives a sequential information stream. Some examples of sequential information streams filtered by the invention include streams of bit mapped images, streams of stock quotations, streams of newswire service information, etc.

Appendix B shows examples of standardized functions for tag registration and examples of standardized functions used to request the contents of tagged fields. Appendix B also includes a "GET NEW MESSAGE" function used by filter module 214 in step 330 of FIG. 3.

Appendix C shows examples of standardized functions for action registration and a standardized function used to request a registered action.

Appendix D shows an example of predetermined filtering rules stored in rule set 216 of a type suitable for filtering VMS Mail. These rules are shown for purposes of example only, and not as a limitation. Other rules may be stored in rule set 216.

In one preferred implementation, application program 210, interface module 220, and filter module 214 are preferably linked together into a single executable source program by a software program called a "linker" or "mapper." Monitor module 206 and edit module 207 my also be linked into this executable source program.

Alternatively, application program 210 and interface module 220 may be linked into a first executable module and filter module 214 may be linked into a second executable module. Again, monitor module 206 and edit module 207 may also be linked into the first executable module. The first executable module, i.e., the interface module then acts as a server by filling requests for tag information, action information, contents of tagged fields, and performance of actions received from the second executable module, i.e., the filter module. This alternative implementation is useful for a Local Area Network (LAN), where the first executable module is located on one node and the second executable module is located on another node. The present invention may also exist in a windows environment, or may be executed in batch mode or from a terminal.

One of the advantages which may be realized from the present invention is that only one interface module need be written for each application program, and the filter module can access the interface module using standard functions. Thus, the filter module can access the information stream of any application program by performing tag registration and action registration operations and then using the registered tag and action information to access the contents of a current message from the interface module. The filter module also can direct the performance of various actions by any application program through the interface module for that program. One or more rule sets can be written for each information stream, depending on the filtering operations required by the user, and a single filter module can perform different filtering operations by accessing different rule sets.

Using this invention, a computer programmer having the technical knowledge concerning the interface functions needed to connect an application program and an interface module, can write filter modules very quickly and efficiently.

As stated above, the present invention can be implemented to filter any application program inputting a sequential information stream. For example, the present invention may be implemented for application programs such as Ultrix Mh (A Unix-related electronic mail system), X.400 (another mail utility), application programs receiving stock market data, graphics data, financial data, and so on.

Some embodiments of the present invention involve information streams having more than one format or information streams having a user-alterable format, such as X.400. In a embodiment of the present invention where X.400 is the application program, tag table 212 is dynamically maintained by filter module 214, i.e., every time filter module 214 requests tag information for a "next current message" from interface module 220, filter 214 also requests an update of the information in tag table 212. Filter module 214 then updates tag table 212 in accordance with the newly received tag information.

Other embodiments will be apparent to those skilled in the art from consideration of the specification and practice of the invention disclosed herein. It is intended that the specification and examples be considered as exemplary only, with a true scope of the invention being indicated by the following claims.

APPENDIX A

VMS MAIL MESSAGE FORMAT:
   FROM: DATE OF RECEIPT:
   TO:
   CC:
   SUBJ:
   MESSAGE BODY:

Thus, the tagged fields in a VMS MAIL are "FROM", "DATE OF RECEIPT", "TO", "CC", "SUBJ", and "MESSAGE BODY". The "DATE OF RECEIPT" and "MESSAGE BODY" fields are identified in actual messages by their placement with respect to the other fields, and are not explicitly labeled by their tag names.

EXAMPLE VMS MAIL MESSAGE
   FROM: XANADU::POST "Dr. Mark J. Post" 9-APR-1990 12:37:04.52
   TO: SMITH::SMITH
   CC:
   SUBJ: Newspaper article
   The attached article may be of interest to you.

APPENDIX B

EXAMPLES OF TAGGED INFORMATION
REGISTRATION AND ACCESS ROUTINES

CONNECT
   parameters: none
   function: initializes any internal data structures and any communication parameters needed for the filter module to connect to the interface module. This routine is preferably called before any other routines.

DISCONNECT
   parameters: confirm_flag, an integer
   function: Specifies whether any queued actions are to be executed before this routine disconnects the filter module from the interface module. This routine frees any internal data structures and terminates any communications.

GET NUMBER OF FOLDERS
   parameters: numfolders, an integer
   function: returns a number of folders in the information stream.

GET FOLDER NAMES
   parameters: names, array of pointers
   numfolders, an integer
   function: returns in "names" of size "numfolders" pointers to the character string names of the folders in the information stream.

OPEN FOLDER OBJECT
   parameters: name: characters
   folder: pointer
   function: "Name" is the NULL terminated character string name of the folder to open. "Folder" is a pointer to the resulting opened folder object.

CLOSE FOLDER OBJECT
   parameters: folder, pointer
   functions: routine closes the appropriate folder and frees any data associated with it.

GET A NEW CURRENT MESSAGE
   parameters: p, pointer function: gets a new current message from the information stream.

FREE A CURRENT MESSAGE
parameters: p, pointer
function: frees memory used to store a copy of the current message.

GET NUMBER OF TAGS
parameters: info: identifies am information stream
numtags: pointer to memory location for number of tags
function: gets a number of tags associated with messages of the information stream GET TAG VALUES
parameters: info: identifies an information stream
tagvalues: array of pointers to values
numtags: integer
function: returns pointers to tag values in tagvalues array (of size numtags)

GET NUMBER OF FIELDS
parameters: info: pointer
tag: characters (a tag name)
numfields: integer
functions: returns in "numfields" the number of instances of the tag in the current message. For example, a mail message may have multiple "TO" fields due to forwardings.

GET FIELD SIZES
parameters: info: identifies an information stream
tag: characters (tag name)
sizes: integer
numfields: integer
function: returns in "sizes" the number of bytes of each of the "numfields" instances of the tag in the current message.

GET Nth FIELD DATA
parameters: info: identifies an information stream
tag: characters (tag name)
n: integer
data: memory to hold the returned data
functions: returns in "data" copies of the bytes in the nth instance of the field in the current message.

APPENDIX C

EXAMPLES OF STANDARD ACTION REGISTRATION AND PERFORMANCE ROUTINES

GET NUMBER OF ACTIONS
parameters: numactions, pointer
function: "numactions" points to the locations where the number of possible actions for a message of the information stream GET ACTION NAMES
parameters: names: array of characters
numactions: integer
function: returns names of actions in "names", which is of size "numactions"

PERFORM ACTION
parameters: name, characters
folder, identifies current message
argc, characters
argv, characters
functions: "Name" is the name of an action to be performed. "Folder" identifies the current message. "Argc" and "argv" are optional arguments that are passed to the underlying application program. This routine attempts to perform the desired action on the current message. It is up to the implementer of the interface module whether to have the action performed immediately upon call or to be queued for confirmation. If queued, the actions are performed when the DISCONNECT action is performed.

APPENDIX D

EXAMPLE RULES FOR VMS MAIL (stated in English)
IF
FROM field is OLSEN or SMITH
THEN
file the message in my IMPORTANT folder and print it out Fields requested to test <condition>: FROM field
Actions performed if <condition> is true: FILE and PRINT
IF
FROM field is POST and SUBJ field contains PURCHASE ORDER
THEN
send the message to my secretary and file a copy in my PURCHASES folder Fields requested to test <condition>: FROM and SUBJ fields
Actions performed if <condition> is true: SEND and FILE
IF
the MESSAGE BODY field contains FINANCIAL RESULTS and the
DATE OF RECEIPT field is after 3/31/90 and before 8/1/90
THEN
file the message in my Q1-RESULTS folder and send a copy to my staff Fields requested to test <condition>: MESSAGE BODY and DATE OF RECEIPT fields
Actions performed if <condition> is true: FILE and SEND

What is claimed is:

1. A system for information stream filtration, comprising:

a first information stream, including a first set of messages;

a first application program, that receives said first information stream;

a second information stream, including a second set of messages;

a second application program, that receives said second information stream;

a first interface module, communicative through a first application specific interface with said first application program, that receives said first set of messages from said first application program;

a first tag registration procedure, within said first interface module, that outputs a number of field names specific to said first set of messages, wherein said number of field names specific to said first set of messages indicate fields within said first set of messages on which filtering can be performed;

a first action registration procedure, within said first interface module, that outputs a set of actions which may be performed on said first set of messages;

a second interface module, communicative through a second application specific interface with said second application program, that receives said second set of messages from said second application program;

a second tag registration procedure, within said second interface module, that outputs a number of field names specific to said second set of messages, wherein said number of field names specific to said second set of messages indicate fields within said second set of messages on which filtering can be performed;

a second action registration procedure, within said second interface module, that outputs a set of actions which may be performed on said second set of messages;

a filter module, responsive to said first interface module and said second interface module through a single interface, that selects ones of said first set of messages and said second set of messages that satisfy a predetermined set of filter rules, wherein said filter rules are applied to said first number of field names and said second number of field names, and that outputs said selected ones of said first set of messages and said second set of messages into a filtered data section of a memory, wherein moving messages into said filtered data section of said memory is an action in both said first set of actions and said second set of actions, and wherein said predetermined set of filter rules are associated with said action of moving messages into said filtered data section of said memory.

2. The system of claim 1, further comprising a rule sets data structure, containing said predetermined set of filter rules, said filter rules having a general form as follows:

IF <condition> THEN <action>.

3. The system of claim 1, further comprising:

a tag table, written by said filter process, said tag table including said number of field names specific to said first set of messages; and wherein said filter process reads said number of field names specific to said first set of messages from said output of said first tag registration procedure.

4. The system of claim 3, wherein said tag table further includes said number of field names specific to said second set of messages, and wherein said filter process reads said number of field names specific to said second set of messages from said output of said second tag registration procedure.

5. The system of claim 1, further comprising:

an action table, written by said filter process, said action table listing said set of actions which may be performed on said first set of messages; and wherein said filter process reads said set of actions which may be performed on said first set of messages from said output of said first action registration procedure.

6. The system of claim 5, wherein said action table further includes said set of actions which may be performed on said second set of messages, and wherein said filter process reads said set of actions which may be performed on said first set of messages from said output of said second action registration procedure.

7. A method for information stream filtration, comprising:

receiving, by a first application program, a first information stream, said first information stream including a first set of messages;

receiving, by a second application program, a second information stream, said second information stream including a second set of messages;

receiving, by a first interface module, through a first application specific interface with said first application program, said first set of messages from said first application program;

outputting, by a first tag registration procedure within said first interface module, a number of field names specific to said first set of messages, wherein said number of field names specific to said first set of messages indicate fields within said first set of messages on which filtering can be performed;

outputting, by a first action registration procedure within said first interface module, a set of actions which may be performed on said first set of messages;

receiving, by a second interface module, through a second application specific interface with said second application program, said second set of messages from said second application program;

outputting, by a second tag registration procedure within said second interface module, a number of field names specific to said second set of messages, wherein said number of field names specific to said second set of messages indicate fields within said second set of messages on which filtering can be performed;

outputting, by a second action registration procedure within said second interface module, a set of actions which may be performed on said second set of messages;

selecting, by a filter module responsive to said first interface module and said second interface module through a single interface, ones of said first set of messages and said second set of messages that satisfy a predetermined set of filter rules, wherein said filter rules are applied to said first number of field names and said second number of field names; and outputting, by said filter module, said selected ones of said first set of messages and said second set of messages into a filtered data section of a memory, wherein moving messages into said filtered data section of said memory is an action in both said first set of actions and said second set of actions, and wherein said predetermined set of filter rules are associated with said action of moving messages into said filtered data section of said memory.

8. A computer program product including a memory, said memory encoded with executable instructions representing a computer program, said executable instructions comprising:

first interface module code for receiving, through a first application specific interface, a first set of messages from a first application program responsive to a first information stream;

first tag registration procedure code within said first interface module, for outputting a number of field names specific to said first set of messages, wherein said number of field names specific to said first set of messages indicate fields within said first set of messages on which filtering can be performed;

first action registration procedure code within said first interface module, for outputting a set of actions which may be performed on said first set of messages;

second interface module code, for receiving, through a second application specific interface with said second application program, said second set of messages from said second application program;

second tag registration procedure code within said second interface module, for outputting a number of field names specific to said second set of messages, wherein said number of field names specific to said second set of messages indicate fields within said second set of messages on which filtering can be performed;

second action registration procedure code within said second interface module, for outputting a set of actions which may be performed on said second set of messages;

filter module code responsive to said first interface module and said second interface module through a single interface, for selecting ones of said first set of messages and said second set of messages that satisfy a predetermined set of filter rules, wherein said filter rules are applied to said first number of field names and said second number of field names; and outputting code, within said filter module code, for outputting said selected ones of said first set of messages and said second set of messages into a filtered data section of a memory, wherein moving messages into said filtered data section of said memory is an action in both said first set of actions and said second set of actions, and wherein said predetermined set of filter rules are associated with said action of moving messages into said filtered data section of said memory.

* * * * *